United States Patent [19]

Nakajima et al.

[11] Patent Number: 5,105,542
[45] Date of Patent: Apr. 21, 1992

[54] TOOL FOR REMOVING COVERINGS OF A COAXIAL CABLE

[75] Inventors: Yoshikatsu Nakajima; Shojiro Komaki, both of Tokyo, Japan

[73] Assignees: Nakajima Tsushinki Kogyo Co., Ltd.; Engineering and Construction Kandenko, Co., Ltd., both of Tokyo, Japan

[21] Appl. No.: 620,718

[22] Filed: Dec. 3, 1990

[30] Foreign Application Priority Data

Dec. 6, 1989 [JP] Japan .................. 1-315479
Sep. 20, 1990 [JP] Japan .................. 2-248835

[51] Int. Cl.⁵ .................................. B21F 13/00
[52] U.S. Cl. ................................. 30/90.1; 81/9.4
[58] Field of Search ............. 30/90.1, 91.2, 90.6, 30/90.7; 81/9.4, 9.51, 9.41, 9.42, 9.43, 9.44

[56] References Cited

U.S. PATENT DOCUMENTS

| | | | |
|---|---|---|---|
| 1,725,114 | 8/1929 | Gelderen | 30/90.1 |
| 3,548,690 | 12/1970 | Horrocks | 30/90.1 |
| 3,659,483 | 5/1972 | Matthews | 81/9.5 |
| 3,978,582 | 9/1976 | Maytham | 30/90.1 |
| 4,317,279 | 3/1982 | Smith et al. | 30/90.1 |
| 4,452,105 | 6/1984 | Harootion | 81/9.42 |
| 4,557,163 | 12/1985 | Tanner | 81/9.44 |
| 4,559,704 | 12/1985 | Michael | 81/9.4 |
| 4,729,268 | 3/1988 | Morrow | 81/9.4 |
| 4,731,928 | 3/1988 | Jackson | 30/91.2 |
| 4,914,818 | 4/1990 | Hall et al. | 81/9.4 |

FOREIGN PATENT DOCUMENTS 62-271381  11/1987  Japan .

Primary Examiner—Frank T. Yost
Assistant Examiner—Hwei-Siu Payer
Attorney, Agent, or Firm—Stevens, Davis, Miller & Mosher

[57] ABSTRACT

A tool for removing the insulation covering of a coaxial cable. The tool has first and second through holes. The portion having the first through hole will support a cutter member able to adjust the cutting in length of the blade into the outer insulation covering. A scraper member is arranged to scrape-up and cut-off scraps and peel off the insulation covering when the tool is rotated relative to the coaxial cable; the cutter blade cuts in the outer insulation covering in a spiral manner. A certain length of the covering can be removed without doing any damage to an aluminum outer conductor.

12 Claims, 5 Drawing Sheets

FIG_1
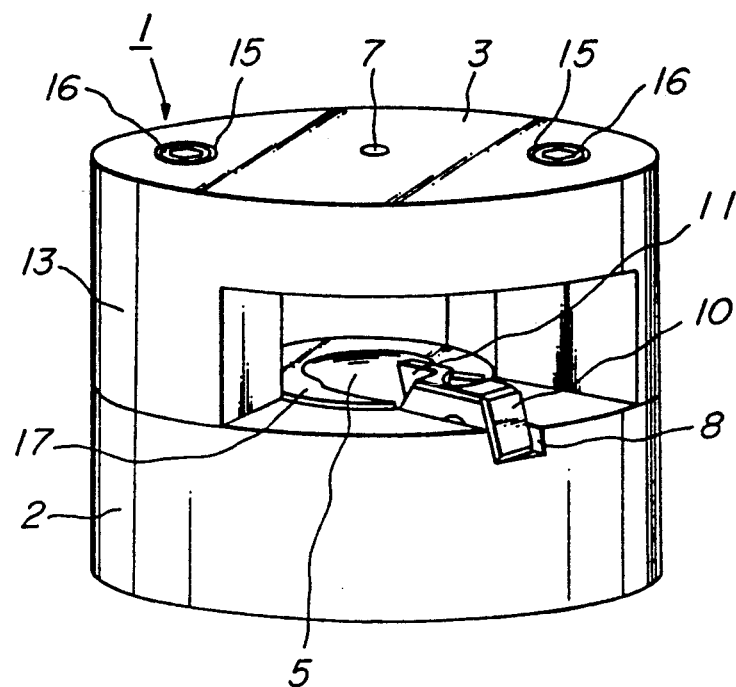
FIG_2
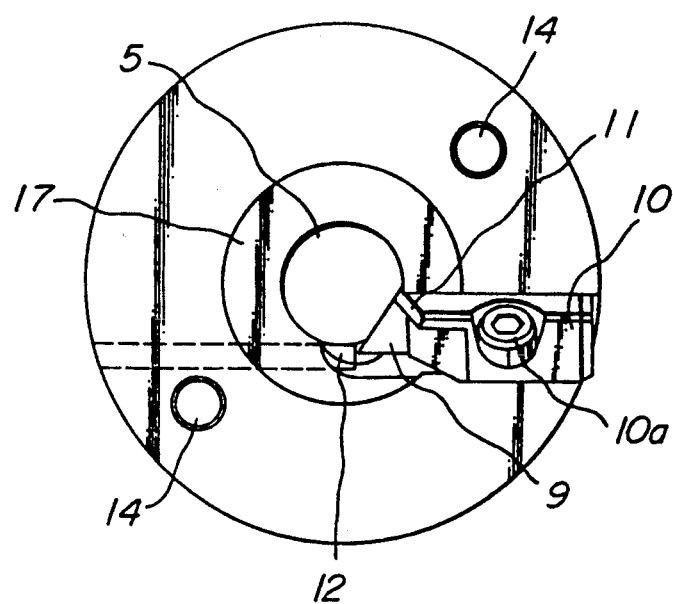

TOOL FOR REMOVING COVERINGS OF A COAXIAL CABLE

BACKGROUND OF THE INVENTION

1. Field of the Invention

The present invention relates to a tool for removing the protecting and insulating covering or coverings of a coaxial cable used in telecommunication or power supply for purpose of connecting to a coaxial cable connector.

2. Prior Art Statement

For removing an outer insulating covering of a coaxial cable in order to connect the coaxial cable to a coaxial cable connector, such as disclosed in Japanese Patent Application Opened Publication No. 62-271,381, it has been a common practice to use a cutter knife in the field. At first a cut is made in the outer protection and insulation covering both in circumferential and axial directions. Then, the covering is peeled off by hand. Also, a particular peeling tool for the removal of covering has been used.

A particular peeling tool for this purpose has the shape of a spanner having two jaws. One jaw of which is fixed and provided with a pair of rollers. The other jaw is arranged movable and provided with a cutter roller. At use, a portion of an outer insulation covering of a coaxial cable is placed between the pair of rollers of the fixed jaw. The movable jaw is moved forward against the fixed jaw so as to push the cutter roller to cut-in at one point of the outer insulation covering of the coaxial cable. Then by rotating the spanner shape tool about the coaxial cable circumferential cut is made in the outer insulation covering so that it can be peeled off. Thereafter, the peeled off portion is removed by using cutting pliers and a nipper or like tool.

However, by using such a conventional cutter knife or peeling tool, it has been very difficult to cut off only the outer insulation covering without damaging the outer conductor of the coaxial cable. More especially, in case of a coaxial cable for CATV purpose, which has the outer conductor made of aluminium pipe, if the pipe is damaged even by a very small cut in the circumferential direction on the aluminium pipe, it easily tends to break by light bending. When it is broken, the transmission characteristics will greatly deteriorate and also might cause trouble in waterproofing.

In cutters for use in outer insulation covering of rubber or like soft materials, the blade of the cutter can very soon be spoiled so that frequent interchange of the cutter blade is required. In case of a cutter knife, a supply of cheap cutter blades is rather easy to obtain and use. However, in case of a particularly designed cutter tool, the tool itself is expensive and the supply of the particular cutter blade is not simple. Thus it has a great disadvantage of high and continuous cost.

Furthermore, for connecting a coaxial cable to a coaxial cable connector, it is necessary to expose a core wire or a central conductor over a predetermined length and to expose the outer conductor over a predetermined length from the base of the exposed central conductor. Thus work is necessary to mark a point on the outer insulation covering by measuring the required length and thereafter the covering is cut from the marked point.

SUMMARY OF THE INVENTION

According to the foregoing situation of the prior art technique, a first object of the present invention is to obtain a tool for removing the covering of a coaxial cable, able to remove the outer insulation covering over a certain length without causing any damage to the outer conductor of the coaxial cable, at low cost, with an easily exchangeable cutter blade, and without need to measure the length of the outer insulation covering to be removed.

Further the second object of the present invention is to realize a tool for removing the covering of a coaxial cable which can remove the outer insulation covering and the inner insulation covering simultaneously. This tool eliminates the need of a two-step covering removal process which had been practised conventionally. Namely, the prior technique entails first removing the outer insulation covering and then a part of the inner insulation covering which is located inside the outer conductor which is formed of aluminium pipe. The inner cover is removed by using a particular tool designed exclusively for the removal of the inner insulation covering. This prior technique is used to fit a coaxial cable to a connector of a type disclosed in Japanese Patent Laid Open Application No. 62-271,381, in which a reinforcement sleeve is interposed in the outer conductor.

For achieving the above mentioned first object, the inventive tool for removing the covering of a coaxial cable for connecting the coaxial cable to a coaxial cable connector, is characterized in that it comprises;

- a bottom portion provided with a first through hole having an inner diameter slightly larger than the outer diameter of the coaxial cable,
- a top portion provided with a second through hole having an inner diameter slightly larger than the outer diameter of core wire of the coaxial cable and to be coupled with said bottom portion with the intervention of spacer members having a height corresponding to a length of the outer insulation covering of the coaxial cable to be removed,
- a cutter accommodating recess provided in said bottom portion at a position adjacent to an end of the outlet of the first through hole and bottom surface to form a certain angle against a plane normally intersecting with an axial line of the first through hole and extending substantially in a radial direction of the bottom portion,
- a cutter member being arranged freely slidable in said cutter accommodating recess with its cutting edge facing against said first through hole, and having a cutter blade being able to be positioned and clamped thereat against the end surface of the outer insulation covering of the coaxial cable of which the cutting end is inserted into the first through hole so as to cut into the outer insulation covering at an inclined angle while leaving a very thin thickness thereof,
- a scraping surface member for scraping off the rest of the thickness of the outer insulation covering being cut in a spiral shape by said cutter edge when the tool is rotated relative to the coaxial cable.

Furthermore, in order to achieve above mentioned second object, the inventive tool for removing covering of a coaxial cable and for connecting the coaxial cable to a coaxial cable connector, is characterized in that it comprises;

a bottom portion provided with a first through hole having its inner diameter slightly larger than the outer diameter of the coaxial cable, a top portion to be coupled with said bottom portion with the intervention of spacer members having a height corresponding to the length of the outer insulation covering to be removed, the top portion being so arranged to support and guide a drill member having a drill axis provided at its center with a second through hole having an inner diameter slightly larger than the outer diameter of the core wire of the coaxial cable, the drill axis having an outer diameter slightly smaller than the inner diameter of the outer conductor of the coaxial cable and having a drill blade length corresponding to said length of the outer insulation covering to be removed, and the drill axis being aligned coaxially with said first through hole in a space formed by the spacer members and to freely slide in the aligned condition, a cutter accommodating recess provided in said bottom portion at a position adjacent to an end of the outlet of the first through hole and the bottom surface to form a certain angle against a plane normally intersecting with an axial line of the first through hole and extending substantially in a radial direction of the bottom portion, a cutter member being arranged freely slidable in said cutter accommodating recess with its cutting edge facing against said first through hole, and having a cutter blade being able to be positioned and clamped thereat against the end surface of the outer insulation covering of the coaxial cable of which the cutting end is inserted into the first through hole so as to cut in the outer insulation covering at an inclined angle while leaving a very thin thickness thereof, a scraping surface member for scraping off the rest of the thickness of the outer insulation covering being cut in a spiral shape by said cutter edge when the tool is rotated relative to the coaxial cable.

To use the inventive tool for removing the covering of the coaxial cable, at first the end of the coaxial cable is cut altogether including the outer insulation covering, outer conductor and the inner insulation covering. This end is termed the "base end". The center conductor is arranged to project over a predetermined length. Then the whole of the coaxial cable having the thus treated base end is inserted into the first through hole of the bottom portion. At this time, the downwardly facing leading edge of the inclined cutter blade of the cutter member will cover a part of the thickness of the outer insulation covering and thus prevent further passage. By rotating the tool while pushing it towards the coaxial cable in a direction to cut into the outer insulation covering, the cutting edge of the cutter blade will cut the covering along a spiral line while leaving a very thin thickness of the covering at the periphery of the outer conductor and the scraping member will scrape up the cut-off scrap and automatically peel off the outer insulation covering. In the meanwhile the core wire will proceed and penetrate into the second through hole in the top portion. By further rotating the tool while pushing against the coaxial cable, the base end of the coaxial cable will abut against the lower surface of the top portion facing against the bottom portion and further stroke is prevented. At this condition if the tool is rotated relatively one more turn, the spiral cut of the outer insulation covering will be clearly cut off from the covering. By the interval between the top portion and bottom portion separated by the spacer members, the outer conductor will be exposed by a certain predetermined length without having any damage by the cutter on it.

In a modified embodiment of the present invention, in which the inner insulation covering is also removed, at first the outer insulation covering, the outer conductor and the inner insulation covering are cut together and the core wire or the inner conductor is arranged to extend over a certain length from the base end. This base end of the coaxial cable is inserted into the first through hole of the bottom portion and the downwardly facing leading edge of the cutter blade will cover a part of thickness of the outer insulation covering and prevent further penetration into the through hole. In this condition, the drill member is shifted up relative to the top portion to separate the top of the drill axis from the opposite end of the first through hole. Thus the core wire extends in the space formed by the spacer members.

Then at first to insert the top end of the core wire into the second through hole provided at the center of the drill axis and the drill axis is shifted down against the first through hole until it reaches the extremity of movement. By this, all the preparation works to remove the outer insulation covering and the inner insulation covering simultaneously have been completed. By rotating and pushing the tool relative to the coaxial cable, while removing the outer insulation covering as explained above, the drill axis will proceed and cut into the inner insulation covering and remove the inner insulation covering. The core wire will proceed into the second through hole provided in the center of the drill axis and the coaxial cable will proceed upwardly until the exposed base end of the outer conductor of the cable will abut against the lower surface of the top portion. From this condition, by rotating the tool one turn more relative to the coaxial cable, a spiral form peeled off scrap portion will clearly be cut and separate from the outer insulation covering and also the removal of the inner insulation covering from inside of the outer conductor is finished. Thus the coaxial cable with covering removed may be withdrawn from the tool and a reinforcement sleeve is put inside the outer conductor and a known coaxial cable connector as has been disclosed in Japanese Patent Application Opened Publication No. 62-271,381 is mounted on this coaxial cable. By the presence of the reinforcement sleeve, the soft cylinder shaped outer conductor made of aluminium will not be deformed and it ma sufficiently bear the clamping force of the connector.

In a preferred embodiment of the present invention, the above mentioned spacer members or spacer means are formed of a pair of projections radially and oppositely arranged on either the bottom portion or the top portion.

Further in a preferred embodiment of the present invention, the cutter member may be formed to have a clamping member in a form of engaging member to engage the cutter blade by fitting in the cutter accommodating recess.

Also in a preferred embodiment of the present invention, the cutter member may have a stopper to provide adjusting of the cutting-in length of the cutting edge of the cutter blade into the outer insulation covering of the coaxial cable.

In a further preferred embodiment of the present invention, the spacer members are formed as a pair of projections integrally formed with the top portion and the engaging block may be formed integrally with one of the projections.

In a very convenient embodiment of the present invention, the spacer members are formed in the shape of a pair of projections integrally formed with the top portion and a complementary recess with the engaging block projecting from the top surface of the bottom portion formed in one of the pair of projections to mate with it.

Also in a convenient embodiment of the present invention, the scraping surface member may be provided in the cutter accommodating recess.

In a further convenient embodiment of the present invention, the scraping surface member is formed integrally with the engaging block.

Throughout the explanation of this specification, terms like "top", "bottom", "upper" or "lower" had been used. However, it should be understood that this is just used for providing an easy understanding of the invention to explain in a relative positions that the tool is used for a coaxial cable with its base end surface facing upwardly and to abut the tool at the end surface. The tool can be used in any direction like horizontal direction or even upside down and the term top, upper or the like will not mean an exact physical positions.

BRIEF DESCRIPTION OF THE DRAWINGS

FIG. 1 is a perspective view of a preferred embodiment of a tool for removing covering of a coaxial cable according to the present invention;

FIG. 2 is a plan view of an upper side of a bottom portion 2 of the tool shown in FIG. 1 facing against the top portion 3;

FIG. 7 is a lateral cross-section taken on line VII—VII of FIG. 5a.

DESCRIPTION OF PREFERRED EMBODIMENTS

Figure 3:
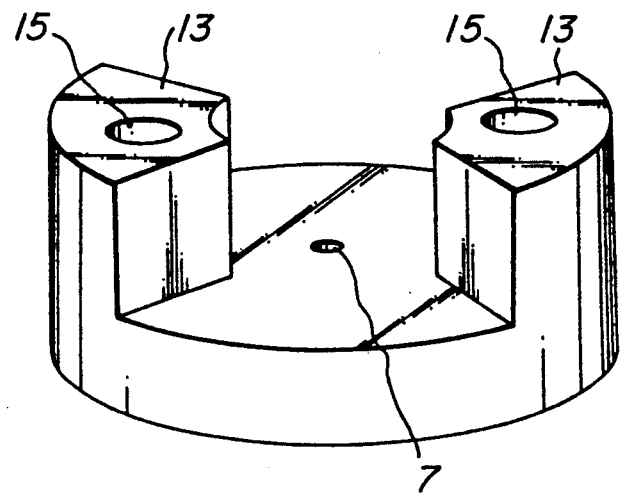
FIG. 3 shows a perspective view of the top portion of the tool placed upside down.

The invention will now be explained in detail by referring to the accompanying drawings.

FIG. 1 shows, in perspective view, a preferred embodiment of the inventive tool 1 for removing the outer insulation covering of a coaxial cable. According to the present invention, the tool is formed from a generally cylindrical lower portion or bottom portion 2 and a generally cylindrical upper portion or top portion 3 coupled by bolts 16 having head with a hexagonal hole and coupled with intermediately positioned spacer members (13). The bottom portion 2 is provided with a first through hole 5 having an inner diameter only slightly larger than the outer diameter of the coaxial cable at its center for passing through the coaxial cable. The top portion 3 is provided with a second through hole 7 at its center for passing through the center conductor or core wire 6 of the coaxial cable 4. These portions can be made of aluminium or hard plastic materials.

At the upper end surface of the bottom portion 2 facing against the top portion, a cutter recess or cutter accommodating recess 8 is provided for housing a cutter member. This cutter housing recess 8 is provided in a manner that the bottom surface of the same will have a small angle with a plane crossing normally against the axial line of the first through hole 5. In the illustrated embodiment, the cutter member comprises a cutter blade 9 having its cutting edge extending toward the first through hole 5 and arranged freely adjustable to slide on the bottom surface of the cutter recess 8, a clamping member in the form of an engaging block 10 to engage the cutter blade 9 and fit in the recess 8, a scraping member 11 to scrape up the removed scrap portion of the outer insulation covering of the coaxial cable, and a stopper member in the form of a screw 12 for adjusting the cutting-in length of the cutting end of the cutter blade to cut into the outer insulating covering of the coaxial cable.

In the illustrated embodiment, the engaging block 10 clamps the cutter blade 9 and couples the block 10 to the bottom portion 2 by mating a bolt 10a having a hexagonal hole head into an inclined bolt hole provided between the engaging block 10 and the bottom portion 2. The cutter blade 9 can be moved against the coaxial cable 4 with its cutting edge inserted into the first through hole 5 to cut into the outer insulation covering 4a from the base end surface thereof and by leaving a very thin thickness of the covering 4a, for instance 0.1 mm, and this position is adjusted by a stopper 12 and clamped at the adjusted position.

The scraping member 11 can also be provided at other location than to provide it on the engaging block 10, for instance in the cutter housing recess 8.

In the embodiment generally shown in FIG. 1 or FIG. 3, the spacer members are formed of a pair of projections 13 integrally formed of the top portion 3 at radially opposite locations. The height of these spacer members are arranged to correspond to the necessary length of the outer conductor to connect the cable to a coaxial cable connector. These projections can be provided on the bottom portion 2 instead of the top portion 3. It is also possible to provide a complementary shaped recess to couple with the engaging block 10 on one of the projections 13 or to form the engaging block integrally with the projections 13.

After setting and clamping the cutter blade 9 on the bottom portion 2, the top portion 3 can be assembled together by aligning the screw bolt holes 14 of the bottom portion 2 and the bolt passing holes 15 of the top portion 3 and thereafter inserting bolts 16 having hexagonal hole head into holes 15 and 14 and fixed by screwing. In order to realize an easy alignment between the first through hole 5 and the second through hole 7, a ring shape projection may be provided on the end surface of the bottom portion 2 facing against the top portion 3 so that the inner surfaces of the projections 13 is coupled to the outer peripheral surface of the ring shape projection 17.

The top portion, bottom portion and the spacer members can be formed integrally by using plastic resin.

Figure 4A:
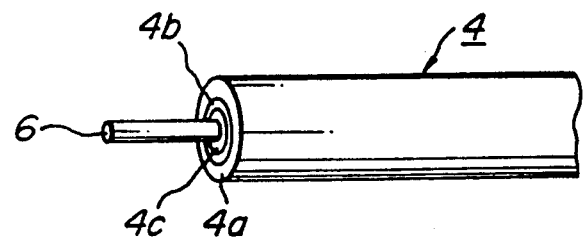
FIG. 4a is a perspective view of an end or base end of a coaxial cable immediately before insertion into the tool.
Figure 4B:
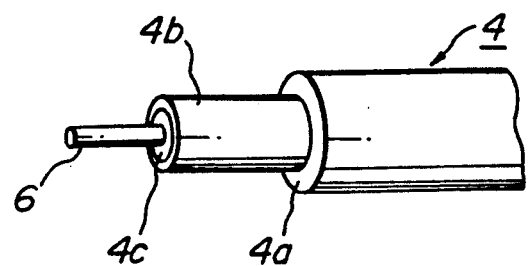
FIG. 4b is a perspective view of the end of the coaxial cable after peeling off the outer insulation covering.

In FIG. 4a, when the coaxial cable is to be handled to remove the outer insulation covering to connect to a coaxial cable connector, the core wire 6 is exposed for a certain length required for connector connection from the base end portion where the outer insulation covering 4a, outer conductor 4b and inner insulation covering 4c are cut together and arranged in one surface as can be seen from FIG. 4a. After arranging the cable end in the above condition, the coaxial cable 4 may be inserted from the bottom end of the first through hole 5 of the bottom portion 2, leading edge of the cutter blade 9 arranged at inclined direction and facing to down side will hit a part of thickness of the outer insulation covering 4a to prevent its further passage. If the tool is mutually rotated relative to the coaxial cable 4 in a direction that the down side faced leading edge of the cutter blade 9 will cut in the outer insulation covering from the base end and pushing the tool against the coaxial cable in the axial direction, the cutting edge of the cutter blade 9 will cut in the outer insulation covering 4a in spiral-wise fashion while leaving a very thin portion of its thickness. At the same time of the said spiral cut, the scraper or scraping surface member 11 will successively scrape up the cutting scrap of the outer insulation covering from the cut off end of the covering and peel it off continuously. During the above process, the core wire 6 will enter and pass through the second through hole 7 of the top portion 3. By further rotating and pushing the tool, the base end portion of the cable will abut against the bottom surface of the top portion 3. Thus further movement is prevented. At this condition by mutually rotating the tool against the coaxial cable by one turn, the peeled off scrap portion connected in spiral form is very easily and clearly cut from the outer insulation covering 4a. By the mutual interval between the top portion 3 and bottom portion 2, provided by the spacer members 13, the outer conductor 4b can be exposed without damaged by the cutter blade and project over a predetermined length.

FIG. 5 shows in a perspective view like FIG. 1, a preferred embodiment of the tool for removing coverings of the coaxial cable according to the present invention. This embodiment is able to remove the inner insulation covering simultaneously with the removal of the outer insulation covering.

In case of this embodiment, the top portion 3 is arranged to support a drill member 18 being freely slidable in the axial direction. This drill member 18 comprises a drill axis supporting portion 20 supporting a drill axis 19 projecting downwardly and guide bars 21 being guided by guide holes 15a provided in the top portion 3 and guide holes 15b provided in the bottom portion 2 in alignment therewith in a manner freely slidable. The top portion 3 is provided with a through hole 22 for passing through the drill axis 19. It is preferred to arrange the through hole 22 for the drill axis facing against the top end of the drill groove being widened radially outwardly so as to escape the drill cut scrap coming up along the drill grooves upwardly at the time of drilling.

It is obvious that many modifications can be considered for supporting and guiding the drill axis supporting portion against top portion 3 and bottom portion 2 freely slidable other than the above mentioned guide bar and guide hole construction.

The cutter blade of the drill axis 19 is arranged over a length substantially equal with the height of the space provided by the spacer members 13. At the center of the drill axis, a core wire through hole 23 is provided for passing through the core wire 6 of the coaxial cable. In order to prevent the drill member 18 from detaching from the top portion 3 and possible loss, it is better to provide a stopper 16A projecting radially in the guide hole 15a of the top portion 3 and to provide a stopper guide groove 16B at side surface of at least one of the guide bars 21 of the drill member 18 mating with this guide hole 15a so that lower end of the guide groove 16B restricts the upper limit of the pulling up stroke of the drill member 18. However, it is also possible not to provide such a stopper 16A so that the drill member 18 can be separated from the top portion 3. It is preferred to provide serrations around the side surfaces of the drill axis supporting portion 20 for allowing easy grip of the same when the portion is rotated relative to the top portion 3.

Figure 5A:
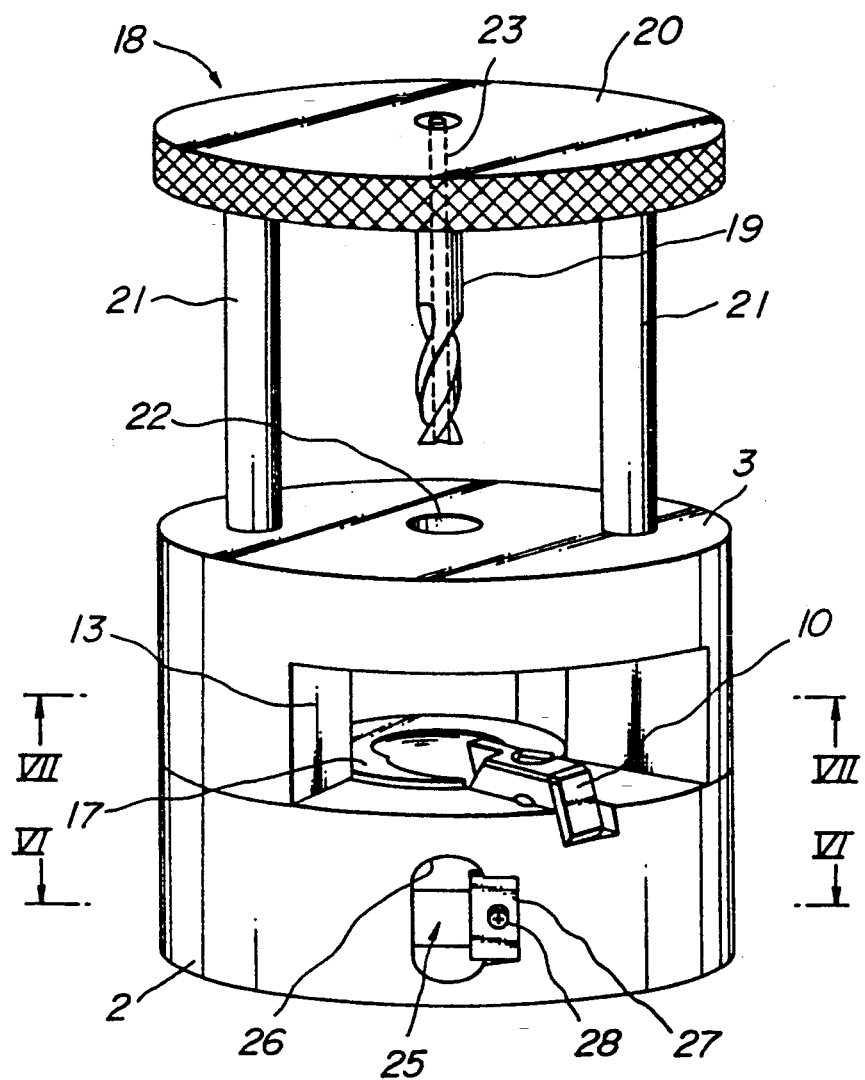
FIG. 5a is a perspective view of further embodiment of the inventive tool in which also the inner insulation covering can be removed simultaneously with the outer insulating covering and it shows a condition that the drill member is lifted upwardly from the body of the tool, which is positioned same as shown in FIG. 1.
Figure 5B:
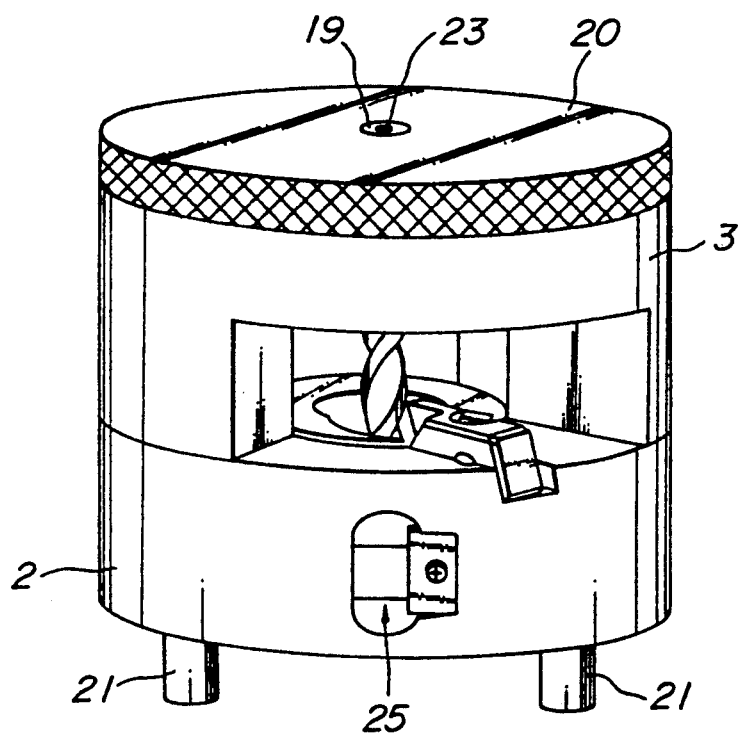
FIG. 5b is a perspective view in the operating condition of the tool of FIG. 5a in which the drill member is pushed against the body of the tool.

FIG. 5a shows a situation where the drill member 18 is pulled upwardly to the extremity from the top portion 3. At this condition, the coaxial cable 4 may be inserted from bottom end of the first through hole 5 of the bottom portion 2. The base end face of the outer insulation covering 4a is stopped by the cutter blade 9. But the core wire 6 of the coaxial cable will extend from the top end of the first through hole 5 into a spacer bound by the spacer member (13). Then the drill member 18 is pushed against the top portion 3 while allowing the top end of the core wire 6 to enter into the core wire through hole 23 up to the position as shown in FIG. 5B. In this condition, the drill axis supporting portion 20 abuts against the upper surface of the top portion 3. By this all the preparation work of removing the insulation coverings have been completed.

Under this condition, by relatively rotating the whole tool 1 and by pushing it against the coaxial cable 4, the outer insulation covering is peeled off as has been explained above. At the same time, the drill axis 19 will cut into the inner insulation covering 4c at the inside of the outer conductor 4b. The cutting off of the scrap of the covering will be brought out along the spiral form drill groove of the drill axis 19. The core wire 6 will proceed into the second through hole at the center of the drill axis 19 i.e. into the through hole 23 for passing the core wire and the tool 1 may be forwarded with respect to the coaxial cable until the top end of the exposed outer conductor 4b will abut against the bottom surface of the top portion 3. By further rotating once the tool 1 relative to the coaxial cable, the spirally connected peeled off scrap portion will be cut clear from the outer insulation covering 4a and also the removal of the inner insulation covering 4c inside the outer conductor 4b is completed. The coaxial cable peeled off the covering may be withdrawn from the tool 1. A reinforcing sleeve, known per se, from for instance Japanese Patent Application Opened No. 62-271,381, having the outer diameter slightly less than the inner diameter of the outer conductor 4b and the length substantially equal to that of the exposed outer conductor 4b may be inserted into the outer conductor 4b and the coaxial cable connector is mounted in a known matter also disclosed in the above patent publication.

Figure 6:
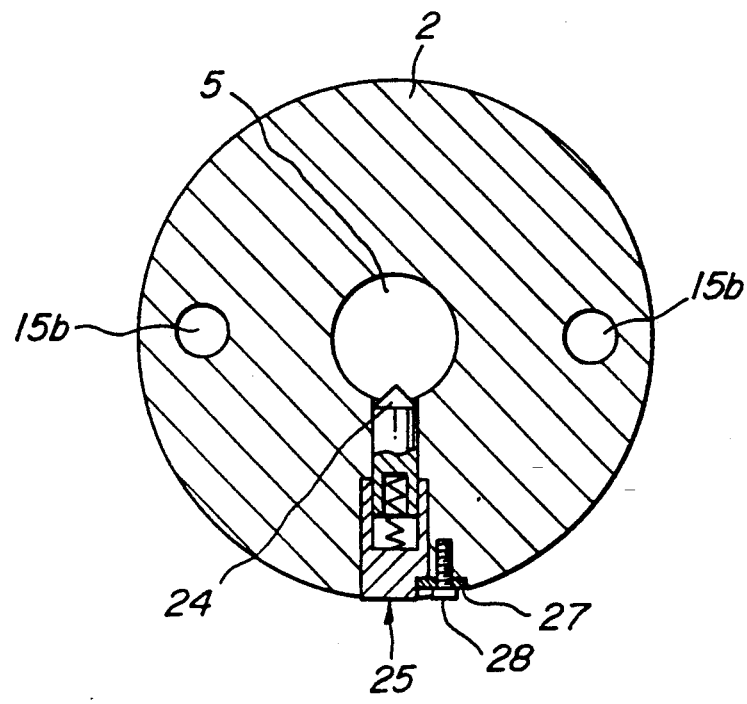
FIG. 6 is a cross-section taken on line VI—VI of FIG. 5a for showing in detail of the marker member of the tool for removing covering of the coaxial cable according to the present invention.
Figure 7:
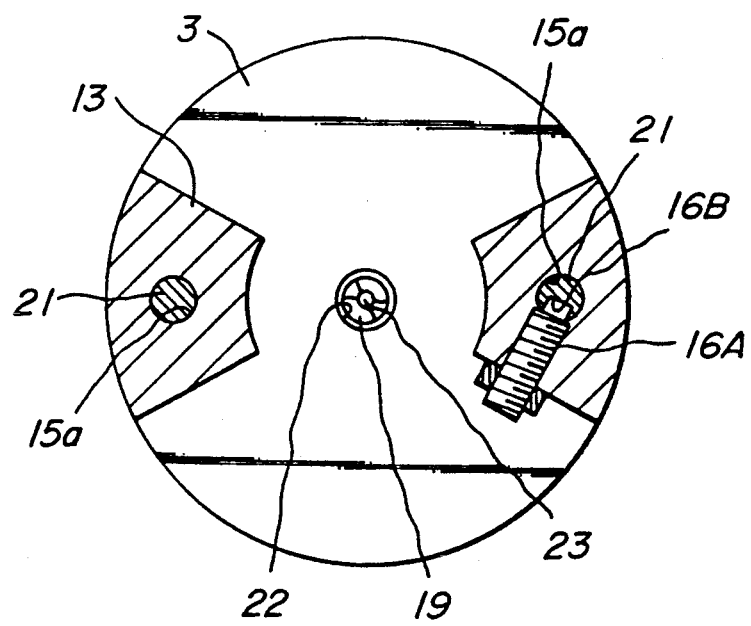

In a preferred embodiment of the present invention, a marker member 25 having marker projection 24 as shown in FIG. 6 slightly projecting radially inside into the first through hole 5 by spring bias may be provided in the bottom portion 2. By means of this marker projection 24, the outside surface of the coaxial cable, from which the insulation covering is to be removed can be marked clearly. This mark is put at a location for confirming a complete clamping of the connector mounted on the end of the cable when the connector is mounted. The connector is for instance disclosed in the above mentioned Japanese Patent Application Publication No. 62-271,381. The marker member may also be provided in a slit 26 in the bottom portion 2 so as to make its axial position adjustable. The location thereof may be fixed by a clamping element 27 and a clamping screw 28 so as to fit various kind of connectors and afford to confirm secure mounting of the same.

By using the tool for removing the covering of the coaxial cable according to the present invention, the cutting edge of the cutter blade will never reach the outer conductor so that the outer conductor is not damaged at all and perfectly free from damages. Moreover, for the cutter blade, cheap and easily obtainable cutter knife, segment breaking-off type sold in the market can be used. Therefore advantages of very cheap operating cost and easy exchange of the cutter blade can be obtained. The outer insulation covering can be removed for a certain length without the need of measuring the length of the outer insulation covering to be removed.

In accordance with the further embodiment of the inventive tool for removing the covering of the coaxial cable provided with the drill member, the insulation coverings at outside and inside of the outer conductor can be removed simultaneously by the cutter blade and by the drill axis respectively.

What is claimed is:

1. A tool for removing covering of a coaxial cable so that the cable may be connected to a coaxial cable connector, the tool comprising;
    a bottom portion provided with a first through hole having an inner diameter slightly larger than the outer diameter of the coaxial cable,
    a top portion provided with a second through hole having an inner diameter slightly larger than the outer diameter of a core wire of the coaxial cable;
    means for coupling said top portion with said bottom portion and at least one spacer member between said top and bottom portion having a height corresponding to a length of an outer insulation covering of the coaxial cable to be removed,
    said bottom portion having a bottom surface, and a cutter accommodating recess provided in said bottom portion at a position adjacent to the outlet of the first through hole and the bottom surface to form a certain angle with respect to a plane normally intersecting with an axial line of the first through hole and extending substantially in the radial direction of the bottom portion,
    a cutter member being arranged freely slidable in said cutter accommodating recess with its cutting edge facing toward said first through hole, and positioned so as to cut spirally into the outer insulation covering at an inclined angle while leaving a very thin thickness of insulation,
    clamping means on said bottom portion to engage and fix the position of the cutter member, stopper means positioned adjacent said cutter member so as to vary the depth of the cut,
    a scraping surface member adjacent said cutter member for scraping off the rest of the thickness of the outer insulation covering being cut in spiral shape by said cutter member when the tool is rotated relative to the coaxial cable.

2. A tool as claimed in claim 1, wherein the at least one spacer member is formed by a pair of projections radially and oppositely arranged with respect to the first through hole.

3. A tool as claimed in claim 1, wherein the at least one spacer member is formed by a pair of projections radially and oppositely arranged with respect to said second through hole on the top portion.

4. A tool as claimed in claim 1, wherein the clamping means is in the form of an engaging member to engage the cutter blade by fitting into the cutter accommodating recess.

5. A tool as claimed in claim 1, wherein the scraping surface member is provided in the cutter accommodating recess.

6. A tool as claimed in claim 1, wherein said cutter member is carried in an engaging block and the scraping surface member is formed integrally with the engaging block.

7. A tool for removing the covering of a coaxial cable so that the cable may be connected to a coaxial connector, the tool comprising;
    a bottom portion provided with a first through hole having its inner diameter slightly larger than the outer diameter of the coaxial cable,
    a top portion for coupling with said bottom portion, at least one spacer member for positioning between said top and bottom portion and having a height corresponding to length of the outer insulation covering to be removed, the top portion having a second through hole in general axial alignment with said first through hole and a drill member mounted for movement in said first through hole having an inner diameter slightly larger than an outer diameter of the core wire of the coaxial cable, the drill member having an outer diameter slightly smaller than an inner diameter of the outer conductor of the coaxial cable and having a drill blade length corresponding to said length of the outer insulation covering to be removed, the drill member having an axis aligned coaxially with said first through hole in a space formed by the spacer members and freely slidable into said second through hole,
    said bottom portion having a bottom surface, and a cutter accommodating recess provided in said bottom portion at a position adjacent to the outlet of the first through hole and said bottom surface to form a certain angle with respect to a plane normally intersecting with an axial line of the first through hole and extending substantially in the radial direction of the first through hole,
    a cutter member being arranged freely slidable in said cutter accommodating recess with its cutting edge facing toward said first through hole, and positioned so as to cut spirally into the outer insulation covering at an inclined angle while leaving a very thin thickness of insulation,
    clamping means on said bottom portion to engage and fix the position of the cutter member, stopper means positioned adjacent said cutter member to limit the free slidability of the cutter member so as to vary the depth of the cut, a scraping surface member adjacent said cutter member for scraping off the rest of the thickness of the outer insulation covering being cut in a spiral shape by said cutter member when the tool is rotated relative to the coaxial cable.

8. A tool as claimed in claim 7, wherein the at least one spacer member is formed by a pair of projections radially and oppositely arranged with respect to the first through hole.

9. A tool as claimed in claim 7, wherein the at least one spacer member is formed by a pair of projections radially and oppositely arranged with respect to said second through hole on the top portion.

10. A tool as claimed in claim 7, wherein the clamping means is in the form of an engaging member to engage the cutter blade by fitting into the cutter accommodating recess.

11. A tool as claimed in claim 7, wherein the scraping surface member is provided in the cutter accommodating recess.

12. A tool as claimed in claim 7, wherein the scraping surface member is formed integrally with the clamping member.

* * * * *